US006922767B2

(12) United States Patent
Luick et al.

(10) Patent No.: US 6,922,767 B2
(45) Date of Patent: Jul. 26, 2005

(54) SYSTEM FOR ALLOWING ONLY A PARTIAL VALUE PREDICTION FIELD/CACHE SIZE

(75) Inventors: David A. Luick, Rochester, MN (US); Richard J. Eickemeyer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 10/282,813

(22) Filed: Oct. 29, 2002

(65) Prior Publication Data

US 2004/0083349 A1 Apr. 29, 2004

(51) Int. Cl.[7] .............................................. G06F 12/08
(52) U.S. Cl. ...................................... 711/204; 711/213
(58) Field of Search ............................... 711/200–221; 712/23

(56) References Cited

U.S. PATENT DOCUMENTS 5,394,533 A * 2/1995 Doi et al. ....................... 711/3
5,826,074 A * 10/1998 Blomgren .................... 711/204
6,014,734 A * 1/2000 Tran et al. ...................... 712/23
6,016,545 A * 1/2000 Mahalingaiah et al. ..... 712/238
6,622,209 B2 * 9/2003 McCormick, Jr. ........... 711/118
6,675,279 B2 * 1/2004 Arimilli et al. .............. 711/204
6,785,798 B2 * 8/2004 Chou .......................... 711/220

FOREIGN PATENT DOCUMENTS

EP         0286260 A2 * 10/1988   ............ G06F/12/02

* cited by examiner

*Primary Examiner*—Pierre-Michel Bataille
(74) *Attorney, Agent, or Firm*—Arnall Golden Gregory LLP

(57) ABSTRACT

A computational circuit for generating a predicted address value includes an instruction field that contains an instruction value. A value immediate field is associated with the instruction field and includes a offset value and a first subset of lower-order bits. An effective address cache stores a plurality of higher-order bits of a plurality of recently-accessed memory addresses and reads out a value corresponding to a second subset of higher-order bits of a memory address that corresponds to the first subset of lower-order bits. A circuit concatenates the second subset, the first subset and the offset value, thereby generating the predicted address value.

9 Claims, 2 Drawing Sheets

US 6,922,767 B2

SYSTEM FOR ALLOWING ONLY A PARTIAL VALUE PREDICTION FIELD/CACHE SIZE

BACKGROUND OF THE INVENTION

1. Field of the Invention

The present invention relates to computers and, more specifically, to a circuit employed in address prediction in a computational circuit.

2. Description of the Prior Art

One method of improving computer speed is referred to as "pipelining," in which instructions are fed into a pipeline for an execution unit in a multi-stage processor. For example, to process a typical instruction, a pipeline may include separate stages for fetching the instruction from memory, executing the instruction, and writing the results of the instruction back into memory. Thus, for a sequence of instructions fed into a pipeline, as the results of the first instruction are being written back into memory by the third stage of the pipeline, a next instruction is being executed by the second stage, and still a next instruction is being fetched by the first stage. While each individual instruction may take several clock cycles to be processed, since other instructions are also being processed at the same time, the overall throughput of the processor may be greatly improved.

Further improvement can be accomplished through the use of cache memory. Cache memory is a type of memory that is typically faster than main memory in a computer. A cache is typically coupled to one or more processors and to a main memory. A cache speeds access by maintaining a copy of the information stored at selected memory addresses so that access requests to the selected memory addresses by a processor are handled by the cache. Whenever an access request is received for a memory address not stored in the cache, the cache typically retrieves the information from the memory and forwards the information to the processor.

The benefits of a cache are maximized whenever the number of access requests to cached memory addresses, known as "cache hits," are maximized relative to the number of access requests to non-cached memory addresses, known as "cache misses." One way to increase the hit rate for a cache is to increase the size of the cache. However, adding size to a cache memory may increase costs associated with the computer and may extend the access time associated with the cache.

For integer and commercial code streams, manipulation of addresses dominates the workload. In an instruction cache, the array area is generally proportional to the maximum size of the addresses stored therein. In attempting to implement value prediction for 64-bit architectures, the cache array area used to cache predicted values doubles over 32-bit architectures. This not only costs significant chip area but it slows down the value predict cache/array access as well.

In a 64-bit architecture, the higher-order bits of 64-bit addresses tend to be highly correlated in time, especially for segmented address models. This occurs because typically only four to eight segments are hotly active at a given point in the program, even though dozens of addresses may exist. In a typical 64-bit architecture, only about 32 lower-order bits of an address change in a nearly random manner, whereas the higher-order 32 bits tend to fall into several slower-changing patterns. Over the course of several hundred sequential cycles, these slower changing patterns of higher-order bits are limited in number and appear to be static.

Therefore, there is a need for a circuit that predicts addresses while using only a limited amount of cache space.

SUMMARY OF THE INVENTION

The disadvantages of the prior art are overcome by the present invention which, in one aspect, is a computational circuit for generating a predicted address value that includes an instruction field that contains an instruction value. A value immediate field is associated with the instruction field and includes an offset value and a first subset of lower-order bits. An effective address cache stores a plurality of higher-order bits of a plurality of recently-accessed memory addresses and reads out a value corresponding to a second subset of higher-order bits of a memory address that, in turn, corresponds to the first subset of lower-order bits. A circuit concatenates the second subset, the first subset and the offset value, thereby generating the predicted address value.

In another aspect, the invention is a method of predicting a next address in a computational circuit in which a plurality of address portions are stored in an effective address cache. Each address portion includes a higher-order portion of an address. The effective address cache is addressed with a subset of bits from a lower-order portion of an immediate address stored in a value immediate field associated with an instruction so as to read out from the effective address cache a higher-order portion of a predicted address. The higher-order portion of the predicted address is concatenated with the lower-order portion of the immediate address, thereby generating a predicted address. The predicted address is transmitted to a pipeline. The predicted address is compared to a known address and, if the predicted address is not identical to the known address, then a signal that indicates that the predicted address is incorrect is asserted.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
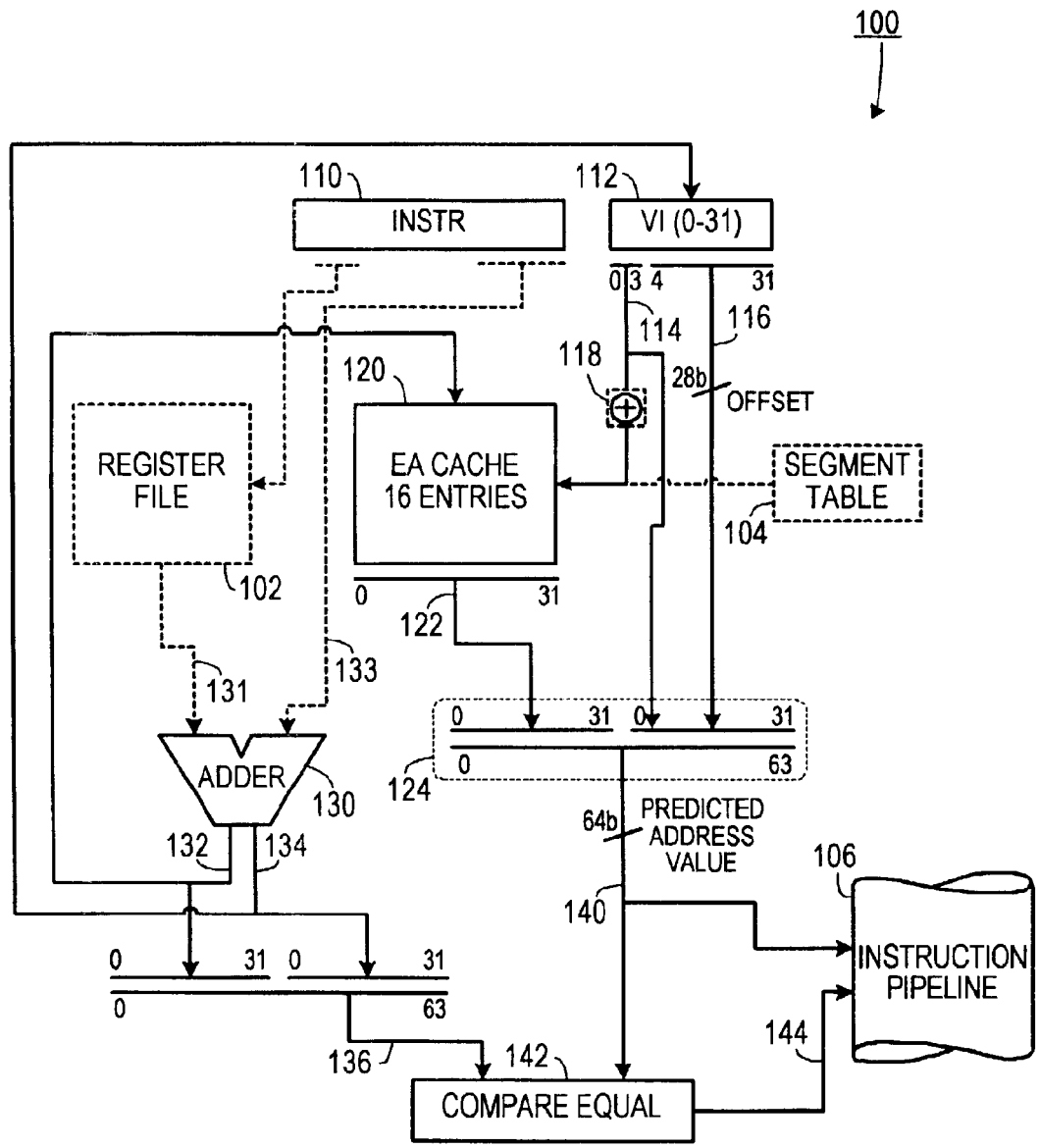
FIG. 1 is a block diagram of one illustrative embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one illustrative embodiment of an address prediction circuit 100, according to the invention, includes an instruction field 110 and an associated value immediate field 112, associated therewith. The instruction field 110 and the value immediate field 112 could be embodied in a register. The instruction field 110 contains an instruction value (e.g., "LOAD"). The value immediate field 112 includes a offset value 116 (bits 4–31 in the example shown) and a first subset 114 of lower-order bits (bits 0–3 in the example shown). The first subset 114 could correspond to a segment table 104 cache addressing scheme, of the type typically used in computational circuits.

An effective address cache 120 (which could include an associative memory) stores a plurality of higher-order bits of a plurality of recently-accessed memory addresses. The effective address cache 120 is addressed by the first subset 114 of lower-order bits (bits 0–3). A value corresponding to a second subset 122 of higher-order bits of a memory address is read out by the effective address cache 120. The second subset 122 corresponds to the first subset of lower-order bits. A circuit 124 (that could be nothing more that a juxtaposition of wires) concatenates the second subset 122, the first subset 114 and the offset value 116. This results in a predicted address value 140 that is sent to the pipeline 106.

A hashing circuit 118, that is responsive to the first subset 114, may be employed to generate an address for the effective address cache. Such a circuit could employ any one of the many hashing algorithms known to the art.

A comparison circuit 142 compares the predicted address value 140 to a known address value 136 and that asserts a signal 144 when the predicted address value 140 does not equal the known address value 136. The known address value 136 is a concatenation of a higher-order portion 132 of the data address and a lower-order portion 134 of the data address. The data address is determined by adding, with a dedicated adder 130, a current address 131 received from a register file 102 to the displacement in the instruction 133. The resultant higher portion 132 is delivered to the effective address cache 120 for future use. The lower-order portion is delivered to the value immediate field 112 to facilitate a future prediction.

Figure 2:
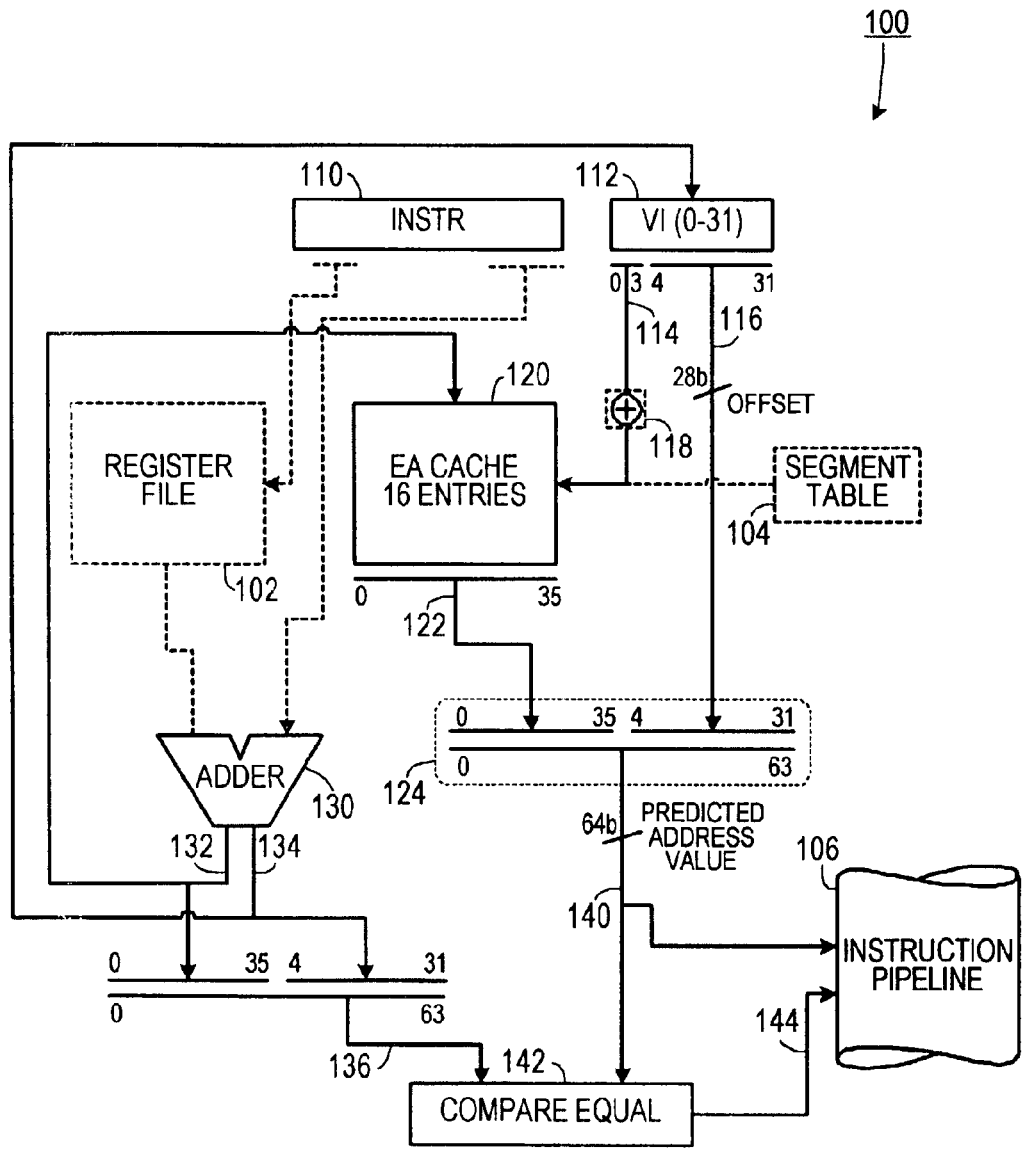
FIG. 2 is a block diagram of a second illustrative embodiment of the invention.

As shown in FIG. 2, the first subset of lower-order bits 114 may be concatenated to the higher order portion 132 of the data address. In this embodiment of the invention, there is no need for an extra wire from the value immediate field 112 to deliver the first subset 114 to the concatenating circuit 124. Such an embodiment may be especially useful if a hashing circuit 118 is employed in generating the address for the effective address cache 120.

While the discussion above shows an embodiment of the invention applied to a 64-bit architecture, it should be understood that the invention could apply to an architecture of any bit length.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A computational circuit for generating a predicted address value, comprising:
   a. an instruction field containing an instruction value;
   b. a value immediate field associated with the instruction field that includes a offset value and a first subset of lower-order bits;
   c. an effective address cache that stores a plurality of higher-order bits of a plurality of recently-accessed memory addresses and that reads out a value corresponding to a second subset of higher-order bits of a memory address associated with the first subset of lower-order bits; and
   d. a circuit that concatenates the second subset, the first subset and the offset value, thereby generating the predicted address value.

2. The computational circuit of claim 1, further comprising a hashing circuit that is responsive to the first subset and that generates an address for the effective address cache that conforms to a predetermined hashing algorithm.

3. The computational circuit of claim 1, wherein the effective address cache comprises an associative memory.

4. The computational circuit of claim 1, further comprising a comparison circuit that compares the predicted address value to a known address value and that asserts a signal when the predicted address value does not equal the known address value, the asserted signal being sent to an instruction pipeline.

5. The computational circuit of claim 4, further comprising a circuit that generates the known address value.

6. The computational circuit of claim 5, wherein the known address circuit comprises a special purpose adder that is responsive to a current address output of a register file and an address displacement value received from a current instruction register and that generates a next address higher-order subset of data and a next address lower-order subset of data, wherein the next address higher-order subset of data is transmitted to the effective address cache.

7. A method of predicting a next address in a computational circuit, comprising the steps of:
   a. storing in an effective address cache a plurality of address portions, each address portion including a higher-order portion of an address;
   b. addressing the effective address cache with a subset of bits from a lower-order portion of an immediate address stored in a value immediate field associated with an instruction, thereby reading out from the effective address cache a higher-order portion of a predicted address;
   c. concatenating the higher-order portion of the predicted address with the lower-order portion of the immediate address, thereby generating a predicted address;
   d. transmitting the predicted address to a pipeline; and
   e. comparing the predicted address to a known address and, if the predicted address is not identical to the known address, then asserting a signal that indicates that the predicted address is incorrect.

8. The method of claim 7, wherein the known address is generated by adding an address displacement value to a current address value.

9. The method of claim 7, further comprising the step of storing a higher-order portion of the known address in the effective address cache.

* * * * *